United States Patent [19]

Søe

[11] 4,376,515
[45] Mar. 15, 1983

[54] APPARATUS FOR THE CONTINUOUS MANUFACTURE OF A MIXED FODDER

[75] Inventor: Niels Søe, Ryomgard, Denmark

[73] Assignee: Pindstrup Mosebrug A/S, Denmark

[21] Appl. No.: 205,630

[22] Filed: Nov. 10, 1980

[30] Foreign Application Priority Data

Dec. 3, 1979 [DK] Denmark .............................. 5127/79

[51] Int. Cl.³ ........................ B02C 18/12; A47J 43/04
[52] U.S. Cl. .................... 241/101 B; 366/169; 366/177; 366/196; 366/329; 366/603; 241/277; 99/485
[58] Field of Search ............... 366/167, 168, 169, 172, 366/173, 177, 196, 325, 329, 603; 241/277, 280, 281, 282.1, 282.2, 101 A, 101 B, 173, 186, 194, 292.1; 99/485

[56] References Cited

U.S. PATENT DOCUMENTS

| | | |
|---|---|---|
| 2,681,090 | 6/1954 | Hicks et al. ..................... 241/101 A |
| 3,163,403 | 12/1964 | Engels ............................ 366/168 X |
| 3,415,494 | 4/1966 | Fisher et al. |
| 3,495,808 | 3/1967 | Klein et al. |
| 3,734,471 | 5/1973 | Engels ................................ 366/173 |
| 3,771,733 | 8/1973 | Hadley et al. |
| 3,986,705 | 10/1976 | Nauta .................................. 366/169 |
| 4,232,973 | 11/1980 | Ligouzat ........................ 366/173 X |

FOREIGN PATENT DOCUMENTS 1084970 6/1960 Fed. Rep. of Germany.
2749256 1/1978 Fed. Rep. of Germany.
2432336 4/1978 France.
437242 10/1935 United Kingdom ........... 241/101 A Primary Examiner—Harvey C. Hornsby
Assistant Examiner—Joseph M. Pitko
Attorney, Agent, or Firm—Bacon & Thomas

[57] ABSTRACT

An apparatus for the continuous manufacture of a mixed fodder comprises a stationary drum having an infeed opening for straw bales at one end of the peripheral drum wall and an outlet for finished fodder mix at the opposite end. Centrally of the drum there rotates a shaft which carries chopping means in the region of the infeed opening and mixing means in a subsequent longitudinal section. For introducing solid additives there are provided one or more openigns at the first mentioned end of the drum. A liquid binding agent can be supplied through the hollow shaft and be sprayed through nozzles secured in the section of the shaft which carries the mixing means. Further liquid constituents may, if desired, be supplied from the opposite shaft end and be sprayed through other nozzles in the shaft. The apparatus is very compact because all constituents are introduced into the drum and processed and mixed therein. It has a low power consumption and it delivers a very homogeneous mixture. The chopping means and/or the mixing means may be shaped so as to create an air stream through the drum from the infeed end towards the outlet in order to support the travel of material towards the outlet.

10 Claims, 6 Drawing Figures

APPARATUS FOR THE CONTINUOUS MANUFACTURE OF A MIXED FODDER

BACKGROUND OF THE INVENTION

This invention relates to apparatus for the continuous manufacture of a mixed fodder the constituents of which comprise chopped straw and one or more solid and liquid additives, said apparatus having means for chopping straw supplied in bale form and means for mixing the further constituents with the chopped straw.

As solid additive or additives there may be employed inter alia ground grain, finely sliced beets or turnips, silage, and granulated or powdered concentrates. Furthermore, proteins, minerals and/or vitamins may be added in appropriate amounts. Among liquid additives there is often used molasses which, besides being a readily digestible foodstuff, is highly adhesive and, thus, can act as a binding agent for the solid constituents so that later separation thereof is avoided. It is, however, also possible to use other suitable liquid additives, e.g. based on animal fat. Instead of straw, including straw of grass seeds, hay could be used, and the term "straw" as employed herein includes also hay.

There is known an apparatus of the kind referred to in which the straw bales are comminuted in a straw chopper built together with a fan which mixes the chopped straw with the solid additives and conveys this dry mix through a pipe to a cyclone wherein the solids are separated from the conveying air and then fed into a molasses mixer where molasses are added and from which the finished mixture is withdrawn.

This known apparatus is bulky and relatively expensive due to the several individual devices of which it is composed. The pneumatic transportation of the dry constituents from the straw chopper to the molasses mixer increases the power consumption of the apparatus to a substantial degree, and in addition it involves the risk of undesired separation of the constituents during the transportation whereby the finished mixture as delivered from the molasses mixer becomes inhomogeneous.

SUMMARY OF THE INVENTION

According to the present invention an apparatus of the kind referred to initially is characterized in that it comprises a stationary drum which at one end has an infeed opening for straw bales in its peripheral wall as well as one or more further infeed openings for the solid additive or additives, and which at its opposite end has an outlet for the finished fodder mix, in that centrally within the drum there is journalled a relatively fast rotating shaft which in one section of its length aligned with the straw bale infeed opening carries a plurality of axially staggered chopping means, and which in a subsequent longitudinal section carries the mixing means, and in that nozzles for injecting liquid additive towards the mixture of materials travelling along the drum wall are provided in the drum.

An apparatus of this construction is considerably more compact than the known apparatus because the comminution of the straw and the mixing of all the constituents take place within the drum. The operation of the apparatus is more economical because it has no power consumption for pneumatically transporting the solid constituents between mutually spaced devices, and in this context there has also been created a greater certainty for a constant mixing ratio of the solid constituents. The chopping means, which rotate together with the shaft, furthermore effect a uniform mixing of the solid additives and the chopped straw, and together with the rotating mixing means they cause the solid constituents which thus have been pre-mixed, to move towards the drum outlet substantially in the form of a layer travelling along the drum wall. When a liquid binding agent is sprayed towards that layer the binding agent will also be uniformly distributed within the finished product which, thus, obtains a high degree of homogeneity without undesired lumps. The low space requirement and the correspondingly low price of the apparatus makes it suited as a farm plant for processing the farm's own straw, even on smaller farms. In such apparatus the finished fodder mixture may, if desired, be discharged directly to an automatic feeding apparatus. The invention may, however, also be used with advantage in larger, industrial plants from which the finished product is distributed for retail sale, where appropriate after being compacted and packaged.

A particularly efficient distribution of the liquid constituent, such as a binding agent, onto the solid constituents may be obtained by providing a plurality of sets of nozzles spaced along the length of the drum.

The nozzles may be provided in that section of the drum in which the mixing means are secured to the shaft, and between the mixing means.

Between the chopping means and the mixing means one or more further nozzles for injecting a further liquid constituent may be provided. In this way an independent dosage of e.g. binding agent, flavouring agents and/or preservatives is made possible by simple means. The addition of preservatives may be expedient when the fodder mixture produced is not intended for use immediately after its production.

The shaft may be hollow and at least some of the nozzles may be secured in the shaft and oriented outwardly towards the peripheral drum wall. In this embodiment the liquid constituent or constituents are thus sprayed directly towards the material layer on the inner wall of the drum.

Alternatively, the nozzles or some of them may be mounted in the stationary drum wall which simplifies the construction. The orifices of the nozzles may then be located between the mixing means so that the jets emitted from the nozzles are intercepted by the revolving mixing means which thus throw the liquid backwards towards the material layer travelling along the drum wall.

The chopping means may be constituted by or secured to arms extending outwardly from the shaft and shaped with downwardly deflected trailing edges which create an air stream from the infeed end of the drum towards the outlet thereof. The air stream supports the movement of the mixture towards the outlet and creates at the infeed end a certain negative pressure which prevents dust nuisances in the premises where the apparatus is installed.

A further embodiment of the invention is characterized in that the outlet is oriented tangentially relative to the drum and that one or more ejector arms are secured to the shaft in the region of the outlet. In this embodiment the rotary component of motion, which the throughflowing material obtains through the rotation of the chopping and mixing means, can cooperate to effect the discharge of the finished mixture through the outlet.

It is preferred to mount the drum with its axis vertically or substantially vertically and with the outlet at the bottom. This results in a further reduction of the power consumption of the apparatus because gravity cooperates to convey the mixture to the outlet.

Immediately outside the straw bale infeed opening and at one side thereof there may be provided a door supported for pivoting about an axis extending parallel to the drum axis at the rear edge (as viewed from the drum) of the door and spring-biased inwardly towards the opening. This detail is advantageous for the processing of bales which have been compacted in a ram baler and which, therefore, exhibit a certain stratification corresponding to the individual ram strokes. The spring-biased door exerts a back pressure on the bales which normally are supplied in a compact row, and thus counteracts the risk that the infeed of a bale occurs in jerks when the individual layers of the bale are caught by the rotating chopping means in which case the flow rate of straw into the drum would become pulsating with a concomitant non-uniform ratio between the constituents of the finished mixture.

BRIEF DESCRIPTION OF THE DRAWINGS

The invention will now be described in more detail with reference to the accompanying schematical drawings in which.

DETAILED DESCRIPTION

Figure 2:
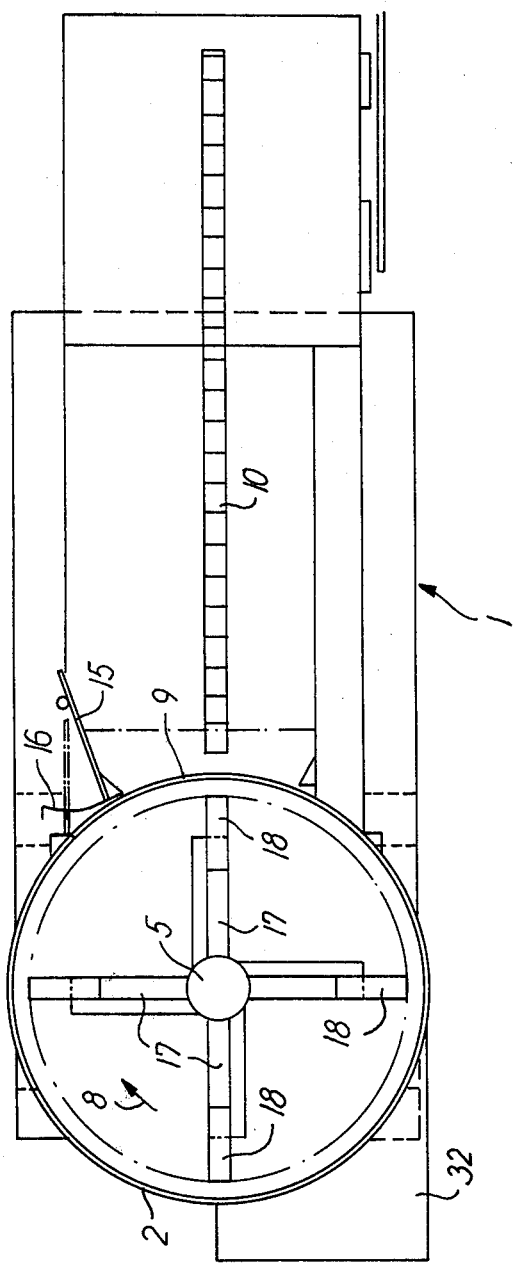
FIG. 2 is a horizontal section along line II—II in FIG. 1.

The apparatus illustrated in the drawings comprises a frame 1 to which there is secured a vertically oriented cylindrical drum 2, the top wall 3 and the bottom wall 4 of which carry bearings for a hollow central shaft 5, which is driven through a belt drive 6 from a motor 7 secured to frame 1. The direction of rotation of shaft 5 has been indicated by an arrow 8 in FIGS. 2 and 4.

In the peripheral wall of drum 2 immediately below top wall 3 there is an opening 9 for the infeed of straw bales supplied by means of a chain conveyor 10 having upstanding carriers 11. Conveyor 10 is driven from a motor 12 mounted on frame 1. The straw bales (not shown) which can be delivered onto conveyor 10 by a further conveyor (not shown) are advanced to opening 9 through a chamber 13 arranged in front of the opening and which is defined at the sides and above by fixed sheet walls while at its rear it is defined by a flap 14 which can pivot about a horizontal shaft below the top wall of the chamber and which closes the chamber when no bales are being supplied. As intimated in FIGS. 1 and 2 that portion of one side wall of chamber 13, which is adjacent to opening 9, may be constituted by a pivoting door 15, the vertical pivot axis of which is located at the rear end of the door and which is spring-biased towards the chamber. In order to reduce dust nuisances during operation of the apparatus an arcuate plate 16, which may slide along the vertical edge of opening 9, is secured to the forward edge of door 15.

Figure 3:
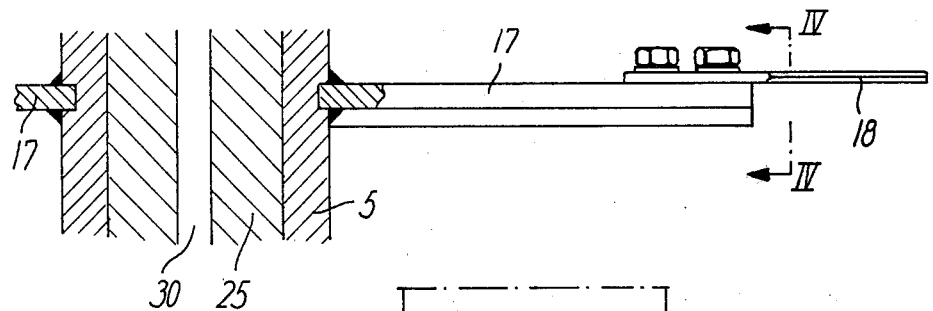
FIG. 3 is a fractional view on a larger scale showing one of the chopping means secured to the shaft of the drum, in elevation.
Figure 4:
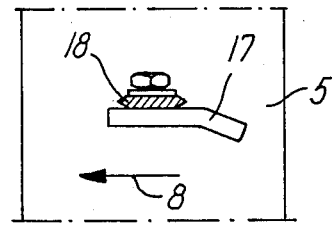
FIG. 4 is a section along line IV—IV in FIG. 3.

To the uppermost longitudinal section of shaft 5 at the level of the infeed opening 9 there are secured a plurality of axially and circumferentially staggered arms 17 each of which carries a detachably secured knife 18 at its outer end. By means of the rotating knives 18 the straw supplied in the form of bales is cut into pieces of suitable length. As best seen in FIGS. 3 and 4, each arm 17 is bent downwardly along its trailing edge whereby the arm acts as a ventilator vane which creates an axially downward air stream through the drum.

Figure 1:
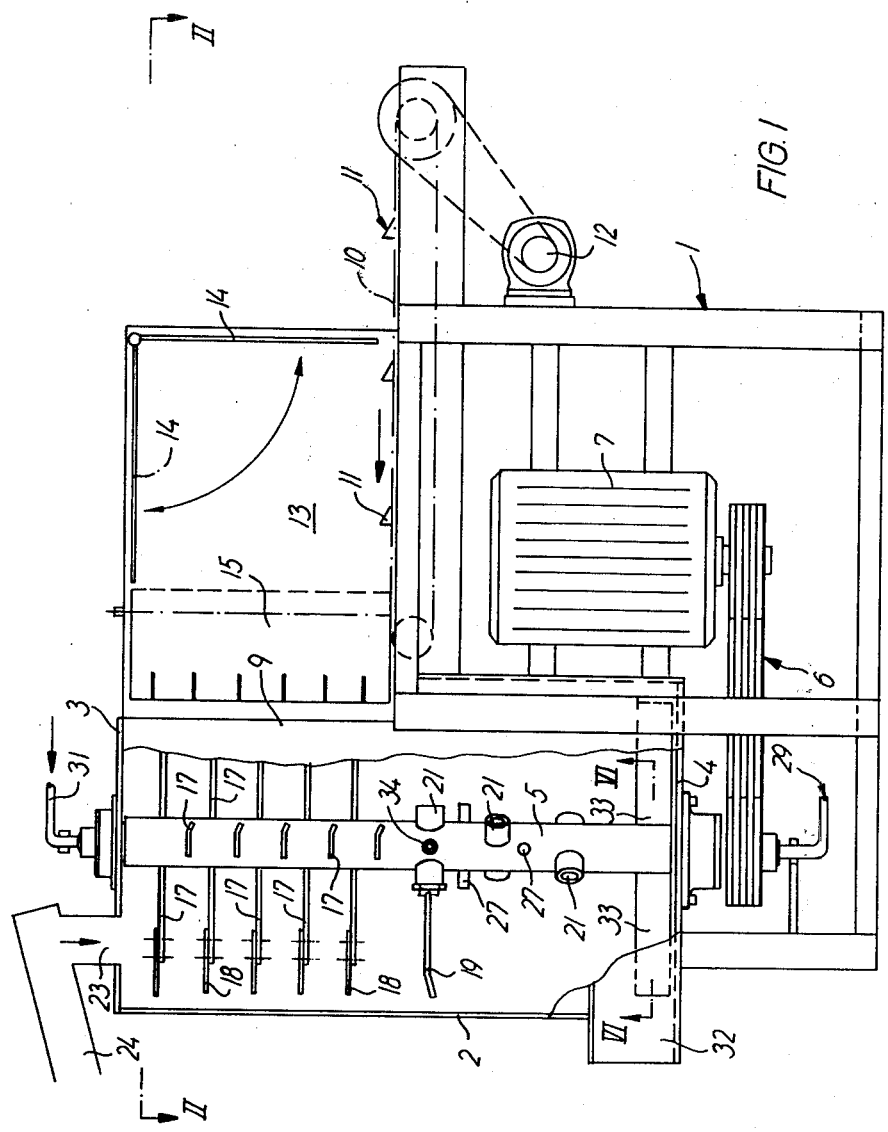
FIG. 1 is an elevation, partly in section, of an apparatus embodying the invention.

Below that section of shaft 5, to which arms 17 are secured, a number of mixing blades or vanes 19 are secured to the shaft. In the embodiment shown there is a total of six vanes arranged in pairs one below the other and with the successive pairs staggered 60°. For the sake of clarity, FIG. 1 shows only one mixing vane.

In the embodiment shown each vane is welded to a threaded pin 20 which is screwed into a radially extending threaded socket 21 welded to shaft 5, and secured by means of a lock nut 22. This arrangement permits an adjustment of the angular positions of the mixing vanes and, hence, of their mixing and conveying effect upon the processed material.

In the embodiment shown the previously mentioned solid additives, which are to be mixed with the chopped straw, are supplied through an opening 23 in the top wall 3 of the drum to which a supply duct 24 is connected. Where appropriate there may be provided several such supply openings, and if it is desired to add e.g. ground grain, a grinder driven from shaft 5 may be provided above the associated opening.

As mentioned above shaft 5 is hollow and two tubular linings 25 and 26, which may be made e.g. from plastic, have been inserted in the shaft from the upper and lower end thereof, respectively. In the region between mixing vanes 19 two pairs of radially oriented nozzles 27, arranged one above the other and offset 90° between them, are secured in the wall of shaft 5. The orifices of the nozzles communicate with the central cavity 28 of lining 26 which in turn, through a pipe coupling in the lower end of shaft 5, is connected to a stationary external tube 29 through which molasses or another suitable binding agent can be supplied at elevated pressure.

Figure 5:
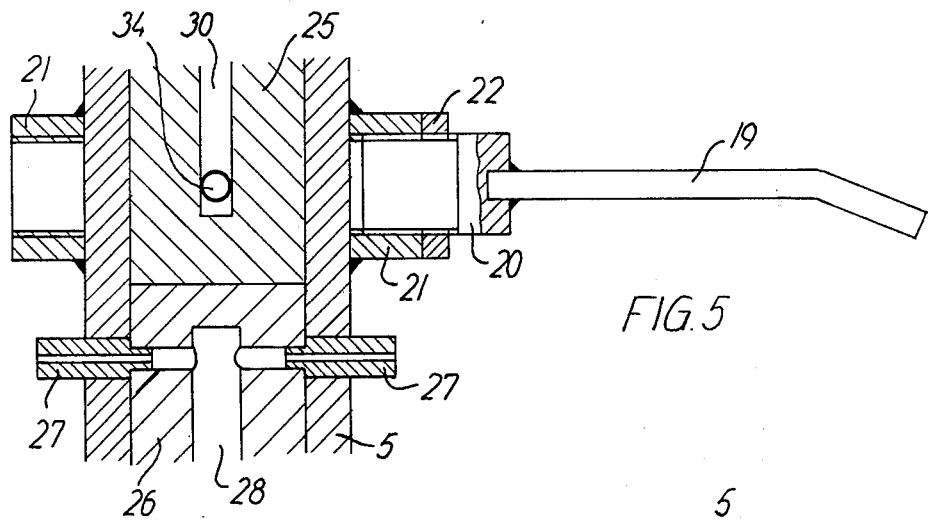
FIG. 5 is a fractional view corresponding to FIG. 3 and showing one of the mixing means.

In FIG. 1 a similar nozzle 34 has been shown between the two uppermost threaded sockets 21 and a corresponding nozzle is provided on the opposite rear side of shaft 5 at the same axial level. These nozzles communicate with the inner cavity 30 (see FIG. 5) of lining 25 which through a pipe coupling at the upper end of shaft 5 is connected to a tube 31 for supplying another liquid constituent, such as propionic acid which in the finished mixture functions both as a preservative and as a flavouring additive.

For all or some of the nozzles 27 and/or 34 secured in shaft 5 there may be substituted similar nozzles secured in the peripheral drum wall and extending radially or substantially radially inward of the wall with their spraying orifices located between the axially staggered vanes 19. The liquid jets emitted through the orifices will then impinge on the vanes from which the liquid is thrown back towards the drum wall along which the mixture of the dry fodder constituents moves downwardly.

Figure 6:
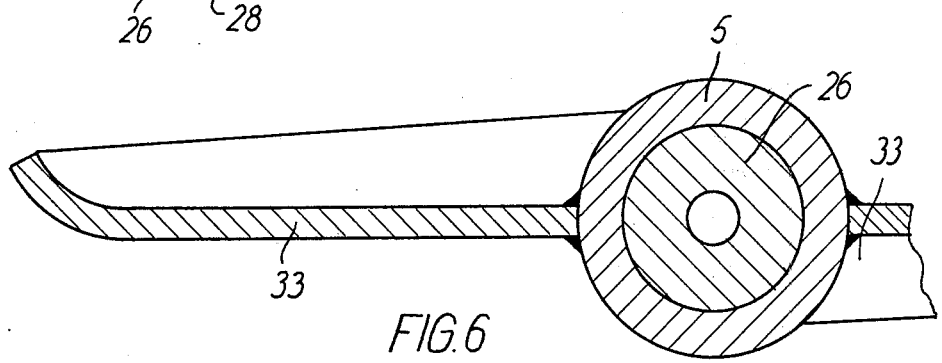
FIG. 6 is a section on the same scale as FIGS. 3-5, along line VI—VI in FIG. 1.

An outlet pipe 32 for the finished fodder mixture resulting from the mixing of the above mentioned constituents, is secured to the drum just above its bottom wall 4. Outlet pipe 32 is oriented tangentially relative to the drum, and for ejecting the mixed material through the pipe two ejector vanes 33 are secured to the lowermost end of shaft 5, see also FIG. 6. From pipe 32 the ejected mixture may be collected in a manner not shown in detail or, if it is to be used immediately, it may be conveyed to feeding apparatus through a suitable transport duct.

For comminuting the straw other known means, e.g. beaters secured to the rotating shaft, could be used instead of the knives described. For mixing the constituents there could also be used other suitable means, e.g. a discontinuous screw. If it is desired to decompose the straw by the so-called dry leaching method, sodiumhydroxide or other decomposing agents can be added to the straw within the drum.

I claim:

1. Apparatus for the continuous manufacture of a mixed fodder, the constituents of which comprise chopped straw, at least one solid additive and at least one liquid additive, said apparatus comprising
   a stationary drum comprising a pheripheral wall and two end walls and having at one end thereof a straw bale infeed opening in its peripheral wall and at least one further infeed opening for said solid additive, and at its opposite end an outlet for the finished fodder mix,
   means for feeding straw bales into said drum through said straw bale infeed opening,
   a rotary shaft extending centrally through the interior of said drum and means for rotating said shaft at a relatively high rate of revolution,
   a plurality of axially staggered chopping means secured to said shaft within a first longitudinal section thereof aligned with said straw bale infeed opening,
   means for mixing said fodder constituents secured to said shaft within a second longitudinal section thereof intermediate said chopping means and said drum outlet,
   the chopping means and mixing means being configured for conveying the chopped and mixed fodder constituents towards the outlet of the drum,
   and nozzles extending into the interior of said drum for injecting said liquid additive towards the mixture of fodder constituents traveling along the peripheral drum wall towards the drum outlet.

2. Apparatus as claimed in claim 1, wherein there is provided a plurality of sets of nozzles spaced along the length of said drum.

3. Apparatus as claimed in claim 1, wherein said nozzles are provided in that longitudinal section of the drum in which said mixing means are secured to said shaft, and between said mixing means.

4. Apparatus as claimed in claim 1, comprising at least one further nozzle provided intermediate said chopping means and said mixing means for injecting a further liquid fodder constituent.

5. Apparatus as claimed in claim 1 or 4, wherein said shaft is hollow and at least some of said nozzles are secured in said shaft and oriented outwardly towards the peripheral drum wall.

6. Apparatus as claimed in claim 1, wherein each of said chopping means is provided on an arm which extends outwardly from said shaft and is shaped with a downwardly deflected trailing edge which creates an air stream from the infeed end of the drum towards the outlet thereof.

7. Apparatus as claimed in claim 1, wherein said outlet is oriented tangentially relative to the drum and at least one ejector arm is secured to said shaft in the region of the outlet.

8. Apparatus as claimed in claim 1, wherein said drum is mounted with its axis at least substantially vertically oriented, and said outlet is located adjacent the bottom of the drum.

9. Apparatus as claimed in claim 1, comprising a door located immediately outside said straw bale infeed opening at one side thereof, which door is supported for pivoting about an axis extending parallel to the drum axis at the rear edge of the door and spring-biased inwardly towards said infeed opening.

10. Apparatus as claimed in claim 1 wherein:
    (a) the shaft is hollow;
    (b) at least some of the nozzles are carried by and in fluid communication with the interior of the shaft; and
    (c) means for supplying liquid additives to the nozzles carried by the shaft through opposite ends of the shaft.

* * * * *